United States Patent [19]

Farrington et al.

[11] Patent Number: 4,471,062

[45] Date of Patent: Sep. 11, 1984

[54] METHOD FOR THE REACTIVATION OF DEACTIVATED PHOSPHOMOLYBDIC ACID BASED CATALYSTS

[75] Inventors: Diane G. Farrington, Brecksville, Ohio; James F. White, West Chester, Pa.

[73] Assignee: The Standard Oil Company, Cleveland, Ohio

[21] Appl. No.: 502,484

[22] Filed: Jun. 9, 1983

Related U.S. Application Data

[63] Continuation of Ser. No. 290,591, Aug. 6, 1981, abandoned, which is a continuation-in-part of Ser. No. 107,736, Dec. 27, 1979, abandoned.

[51] Int. Cl.$^3$ .................. B01J 27/28; C07C 51/25; C07C 51/377; C07C 57/055
[52] U.S. Cl. .................................. 502/34; 260/465.3; 560/214; 562/531; 562/532; 562/534; 562/535; 562/599
[58] Field of Search .................. 502/34, 211; 562/531, 562/532, 534, 535; 260/413 H

[56] References Cited

U.S. PATENT DOCUMENTS

| | | | |
|---|---|---|---|
| 1,678,627 | 7/1928 | Jaeger | 502/34 |
| 2,963,443 | 12/1960 | Nixon | 252/416 |
| 3,326,817 | 6/1967 | Callahan et al. | 252/432 |
| 4,020,174 | 4/1977 | Partenheimer | 260/346.8 A |
| 4,083,805 | 4/1978 | White et al. | 252/437 |
| 4,138,366 | 2/1979 | Shaw et al. | 252/464 |
| 4,182,907 | 1/1980 | Grasselli et al. | 562/546 |
| 4,303,550 | 12/1981 | Callahan et al. | 252/413 |
| 4,307,247 | 12/1981 | Shaw et al. | 562/599 |
| 4,319,042 | 3/1982 | Khoobiar | 562/535 |
| 4,321,160 | 3/1982 | Farrington et al. | 252/437 |

FOREIGN PATENT DOCUMENTS 1464198 8/1974 United Kingdom .

*Primary Examiner*—P. E. Konopka
*Attorney, Agent, or Firm*—Joseph G. Curatalo; Larry W. Evans

[57] ABSTRACT

The present invention relates to a method for the reactivation of phosphomolybdic acid based catalysts used for the conversion of saturated and unsaturated aldehydes to acids. The method comprises the step of feeding an oxide of nitrogen over the deactivated catalyst at a temperature of from about 100° C. to about 400° C. The method can be employed in the reactor by terminating the feed of reactant to the reactor, adjusting the reactor temperature as may be necessary to one suitable for reactivation and sweeping the reactor with a gas. Alternatively, the catalyst can be removed from the reactor for reactivation. Reactivated phosphomolybdic acid based catalysts are also disclosed. These catalysts have a ratio of molybdenum to phosphorus of 3:1 to 15:1 and are prepared by the process of feeding an oxide of nitrogen over the catalyst at a temperature of from about 100° C. to about 400° C.

26 Claims, No Drawings

METHOD FOR THE REACTIVATION OF DEACTIVATED PHOSPHOMOLYBDIC ACID BASED CATALYSTS

CROSS REFERENCE TO RELATED APPLICATION

This application is a continuation of U.S. Ser. No. 290,591 filed Aug. 6, 1981, now abandoned, which in turn is a a continuation-in-part of U.S. Ser. No. 107,736, filed Dec. 27, 1979, now abandoned.

TECHNICAL FIELD

Catalysts comprising phosphomolybdic acid and various salts thereof have recognized utility in several areas of petrochemical processing. An area of particular importance and which exemplifies the present invention is the use of phosphomolybdic acid based compounds as catalysts for the preparation of various acids such as methacrylic acid from saturated and unsaturated aldehydes such as isobutyraldehyde and methacrolein respectively. Catalysis with supported or unsupported dehydrated phosphomolybdic acid in combination with small amounts of promoters such as antimony, arsenic, bismuth, copper, tellurium and hydroxides or decomposable salts of alkalis and alkaline earth metals is a process of specific economic interest.

It has become well known that phosphomolybdic acid (PMA) and salts thereof are sensitive to significant structural change caused by thermal, hydrolytic or reductive stress. As is to be expected, such physical and chemical changes caused by these stresses are directly reflected in a reduction in catalytic activity. Thus, it has not been uncommon for significant catalytic activity to be lost after only a relatively short on-stream time.

Deactivation of PMA based catalysts can occur by processes which cause loss of acid sites via condensation crosslinking. A fully deactivated catalyst might be analogous to the anhydride of $P_2O_5$, which contains no free —OH groups. Contacting an active deammoniated PMA based catalyst with moisture below about 100° C. is a certain means of causing deactivation. In this temperature range water vapor undergoes capillary and surface condensation within the catalyst particles. This fluid phase provides for mass transport within the structure so that deactivating condensation can and does occur. Generally, shutdown of the reactor for significant periods of time is marked by a significant decrease in catalytic activity.

In addition to the cooling down deactivation, other processes that can cause mass transport and result in deactivating condensation crosslinking are deep reduction and thermal excursion. Overheating of the catalyst can also result in complete decomposition of the acid structure to its component oxides $MoO_3$ and $P_2O_5$. While the occurrence of these deactivations can be minimized by avoiding reactor shutdown and otherwise controlling the catalytic process, nevertheless, deactivation inevitably occurs. In fact, in the conversion of methacrolein to methacrylic acid, significant loss of catalytic activity may be noted after only a few hundred hours of use.

The subject invention relates to methods for the effective reactivation of PMA based catalysts having been deactivated in the foregoing conversion of aldehydes to acid. In order for the catalyst reactivation to be practical from a consideration of technical as well as economic aspects, it is necessary that the reactivation scheme be practiced without necessitating reactor shutdown and catalyst removal or, in the case of a fluid-bed operation, that reactivation be capable of execution in a conventional regenerator vessel. This restriction therefore dictates that the deactivated catalyst be reactivated in the vapor phase.

BACKGROUND ART

While much has been published or patented on the subject of PMA based catalysts and their uses as oxidation catalysts and, reactivation of other catalysts is generally known, very little prior work directed toward the reactivation of PMA based catalysts has been reported. One such method that is known is disclosed in Japanese patent application, No. 77/29,660, filed by Mitsubishi Rayon Co., Ltd., which describes the regeneration of a PMA based catalyst by treatment with ammonium hydroxide, and hydrogen peroxide or ozone and optionally also with nitric acid or ammonium nitrate. The inventors reported that the initial oxidation of methacrolein with the fresh catalyst gave 88% selectivity to methacrylic acid with 66% conversion of methacrolein; the spent catalyst gave only 71.5% selectivity to methacrylic acid with 30.3% conversion of methacrolein and, that following regeneration with ammonium nitrate and ammonium hydroxide and 5 parts of 30% hydrogen peroxide for 30 minutes at 90° C., the catalyst gave 88.1% selectivity to methacrylic acid with 65.1% conversion of methacrolein. This process is undesirable inasmuch as it merely attempts to oxidize the deactivated catalyst and to do so outside of the reactor, necessitating shut-down.

Several other Japanese patents exist which disclose the use of ammonia for regeneration of spent PMA catalysts. However, none of which we are aware is directed toward reactivation of PMA based catalysts with nitrogen oxides.

Use of nitric oxide to reactivate a supported palladium catalyst containing 1% palladium has been described in Japan Kokai 75, 75, 587 wherein full reactivation was obtained by heating the catalyst with acetic acid in the presence of a nitrogen containing oxidant followed by treatment with potassium acetate. The latter treatment is indicative of a reconstructive regeneration. German Offenlegungsschrift No. 2,126,007 sets forth a regeneration scheme for a spent aluminum oxide/boric oxide rearrangement catalyst by heating while fluidizing with air containing nitrogen oxide.

In more recent work, conducted in the laboratories of the Assignee of record herein, PMA based catalysts have been regenerated in the presence of ammonia and hydrochloric acid. Such a process is referred to as corrosive reconstruction wherein a reconstructive transformation occurs generally involving the breakdown of one crystal lattice and the reorganization of another. Unless catalyzed in some manner, such reconstructive transitions have an appreciable activation energy compared to displacive transitions wherein only relatively minor shifts of atoms occur. It is believed that displacive transition would permit a deactivated catalyst to be reactivated in situ with a single oxidizing gas.

Thus, the prior art of which we are aware has not set forth a method by which a deactivated PMA based catalyst can be reactivated with only a gaseous oxide of nitrogen or mixtures thereof. To be useful, we believe the reactivation of PMA based catalysts must occur in the vapor phase, and whether inside or outside of the reactor, without catalyst removal. It is also necessary to reactivate the catalyst in a manner that is compatible with a fluid-bed process. It would be further useful to be able to treat the catalyst during on-stream use thereby maintaining its activity over greater periods of time.

DISCLOSURE OF THE INVENTION

It is therefore an object of the present invention to provide a method for the reactivation of PMA based catalysts utilized in the preparation of acids from saturated and unsaturated aldehydes.

It is another subject of the present invention to provide a method for the reactivation of PMA based catalysts which have become reduced during the conversion of compounds such as unsaturated aldehydes, acids, esters and substituted and unsubstituted aromatic compounds and saturated aldehydes, alcohols, esters and nitriles.

It is another object of the present invention to provide a method for readily reactivating PMA based catalysts without necessitating removal of the catalyst from the reactor for treatment followed by the reloading thereof.

It is yet another object of the present invention to provide a vapor phase method for reactivating PMA based catalysts.

It is still another object of the present invention to provide a method for reactivating PMA based catalysts that can be employed during on-stream use of the catalyst.

It is yet another object of the present invention to provide reactivated phosphomolybdic acid based catalysts, having a ratio of molybdenum to phosphorus of 3:1 to 15:1, reactivated by the process of feeding an oxide of nitrogen over the catalyst.

These and other objects, together with the advantages thereof over known methods, which shall become apparent from the specification which follows, are accomplished by the invention as hereinafter described and claimed.

In general the method of the present invention involves the step of feeding an oxide of nitrogen or mixtures thereof over the deactivated catalyst at a temperature of from about 100° C. to about 400° C. When the method is to be conducted in situ, the additional steps of terminating the reactant feed, adjusting the reactor temperature to that which is necessary for the reactivation and sweeping the reactor with an inert gas are first conducted. If the reactivation is to be conducted outside of the reactor, its initial removal to a suitable regenerating vessel is all that is required prior to treatment, followed by its return to the reactor. The catalysts reactivated are those having a ratio of molybdenum to phosphorus of 3:1 to 15:1.

As will be discussed in greater detail hereinbelow, the nitrogen oxide preferably employed is nitric oxide which is passed over the catalyst for a period of at least five minutes and at a rate to provide a contact time therewith of at least two seconds. The nitric oxide is preferably fed to the reactor in admixture with an inert gas such as nitrogen or helium.

Reactivated phosphomolybdic acid based catalysts are also provided. These catalysts have a ratio of molybdenum to phosphorus of 3:1 to 15:1 and are prepared by the process of feeding an oxide of nitrogen over the catalyst at a temperature of from 100° C. to about 400° C.

PREFERRED MODE FOR CARRYING OUT THE INVENTION

The catalyst commonly employed in the preparation of methacrylic acid from methacrolein or isobutyraldehyde is a PMA based catalyst which can be provided with one or more promoters and which has the general formula $Mo_xP_yA_aB_bC_cD_dE_eO_z$. Suitable promoters include the following: where A is ammonium, cesium, potassium, rubidium and/or thallium; B is copper and/or vanadium; C is antimony, arsenic, bismuth and/or tellurium; D is palladium; E is aluminum, barium, calcium, cerium, chromium, cobalt, iron, magnesium, manganese, nickel, tantalum, titanium, tungsten, zinc, zirconium, chlorine and/or bromine; and, wherein x can be 3 to 15 and is preferably 12, y can be 1 to 1.5, a can be 0.1 to 3 and is preferably 1 to 2, b can be 0.1 to 3 and is preferably 0.1 to 1, c can be 0 to 2 and is preferably 0 to 0.7, d can be 0 to 2 and is preferably 0 to 1, e can be 0 to 4 and is preferably 0 to 1, and z is a number necessary to satisfy the valence of all of the other elements. Suitable catalysts and the preparation thereof have been described in several U.S. patents commonly owned by the Assignee of record herein and include, for instance, U.S. Pat. Nos. 4,083,805 and 4,138,366. Of these many catalysts, those having a ratio of molybdenum to phosphorous of from about 3:1 to as high as 15:1 can be employed with 9 to 12:1 being preferred.

The conversion of aldehyde to acid is accomplished with molecular oxygen, conducted directly to the reaction vessel, or supplied as air. Hence, the conversion is an oxidative type or is at least conducted in an oxidative atmosphere. Preparation of methacrylic acid from methacrolein is via selective oxidation of the aldehyde whereas preparation from isobutyraldehyde involves a oxydehydrogenation of the aldehyde. For ease of discussion herein, the preparation of methacrylic acid shall be stated to result from the conversion of saturated or unsaturated aldehydes.

In addition to conversion of saturated and unsaturated aldehydes, PMA based catalysts of the type disclosed herein have been employed in the conversion of other organic compounds both unsaturated and saturated. Typical unsaturated compounds include alcohols and esters which are converted to unsaturated acids; aromatics such as benzaldehyde, to benzoic acid or to esters in the presence of alcohols and, substituted aromatics such as ethylbenzene to styrene. Exemplary saturated types include alcohols which can be converted to unsaturated acids and alkenes under high temperature conditions or to alkenes with and without rearrangement of the chain when conducted at lower temperatures; aldehydes to lower aldehydes at low temperature conversions; nitriles to form modified branched nitriles such as the conversion of isobutyronitrile to methacrylonitrile and, esters which become modified as in the case of methylisobutyrate to methacrylic acid and methyl methacrylate or, isopropyl acetate to acetic acid and propylene.

Thus, the conversion effected by these catalysts can include oxidation, dehydration and oxydehydrogenation. During conversion, the catalyst is reduced and therefore, where deactivation is brought about in this manner, the method of the present invention can be employed for reactivation. Inasmuch as the subject invention is directed toward the reactivation of deactivated PMA based catalysts, it is to be understood that operability of the method claimed is not dependent upon the specific reaction wherein the catalyst had become deactivated. While it is therefore not necessary to provide examples of each different conversion effected in the presence of the PMA based catalysts disclosed herein, the conversion of unsaturated and saturated aldehydes shall be discussed in order to demonstrate the usefulness of the present invention in reactivating the catalyst.

As stated hereinabove, the conversion of aldehydes to acid over the catalyst is conducted in the presence of oxygen and the oxygen and aldehyde reactants e.g., isobutyraldehyde or methacrolein, are preferably carried by steam, with the foregoing reactants collectively being referred to as the reactant feed. The steam can optionally be replaced by recycled gases from the reactor which would normally include nitrogen, oxygen, carbon oxides and other gases which would also comprise a portion of the reactant feed. In some oxidation systems, the reactant feed could also include the effluent from a first stage reactor wherein isobutylene is principally converted to methacrolein. When the effluent comprises the reactant feed, it will be understood that other components will also be present; several that are by-products of the first stage of isobutylene to methacrolein conversion and others such as air which would normally be added for the conversion of isobutyraldehyde or methacrolein.

The conversion reaction can be conducted in either a fixed-bed or fluid-bed reactor at temperatures of from about 200° C. to about 400° C. and pressures of about 0.2 to about 10 atmospheres. The catalyst may be in a supported or unsupported form; suitable support materials including silica, alumina, boron-phosphate, titania, zirconia and the like and preferably Alundum as well as mixtures thereof. The catalyst can have any of the conventional fixed-bed forms such as coated, tablet, pellet, extruded, spherical, or fluid-bed forms such as microspherical or other forms known in the art. Presence of the catalyst increases the rate and percent of conversion, the selectivity of the reaction, e.g., wherein the aldehyde to acid conversion is favored, and the single pass yield.

In normal use, the apparent contact time of feed over catalyst in the reactor can vary from about a fraction of a second to as many as 20 seconds or more. A charge of fresh catalyst will remain active for approximately 100-200 hours after which time a marked decrease in conversion single pass yield and percent total conversion is observed. In order to improve these, the catalyst can be reactivated according to the method of the present invention.

Reactivation includes the step of feeding a nitrogen oxide over the deactivated catalyst. Nitrogen oxides having utility in the present invention include all gaseous oxides of nitrogen as well as nitric or nitrous acid, with nitric oxide being preferred. Additionally, it is believed that other oxidants can be employed; examples of which would include hydrogen peroxide, chlorine and nitrosyl chloride.

The feed of nitrogen oxide is generally conducted over the deactivated catalyst until $CO_2$ evolution is complete. The feed of nitric oxide is generally conducted over the catalyst for a period of time of from about one minute to about several hours when a low rate of feed is employed. The amount of the nitric oxide introduced into the reactor can vary as desired but generally an amount in volume equal to about 0.5 to about 50 times the volume of the catalyst would be satisfactory. Treatment can be conducted at pressures ranging from near atmospheric to superatmospheric. The nitrogen oxide can be separately fed over the deactivated catalyst or combined with an inert carrier such as helium or nitrogen in any ratio of $NO:N_2$ or He of from about 5:95 to 95:5 by volume percent. Of course, other gases, ratios of reactivant to carrier, and pressures can be employed as may be desired. The temperature at which reactivation can be conducted ranges from about 100° C. to about 400° C. with temperatures of 175° C. to 350° C. being preferred.

When the reactivation is to be conducted in situ the reactant feed to the reactor would first be terminated, following which the reactor should be swept with a gas such as air, nitrogen or steam. During this time the temperature could be adjusted from that for the aldehyde conversion to the desired temperature for reactivation as necessary. At this point the nitric oxide/carrier mixture would be fed to the reactor, and, following reactivation, the catalyst will be ready for selective oxidation of the aldehyde. In this manner, downtime for removal of the catalyst is avoided.

Alternatively, in fluid-bed systems, a slip stream could be treated with nitric oxide and then returned to the reaction zone thereby providing continuous catalyst reactivation. It is further envisioned in either fluid or fixed-bed systems that a stream of the nitrogen oxide could be fed concurrently with the hydrocarbon feed at a rate sufficient to prevent deactivation.

In the examples which follow, a mixture of nitric oxide in nitrogen, concentration of the former being approximately 49 volume percent, was fed to deactivated catalysts at a flow rate of 190 cc/minute for a contact time of two to three seconds. Reactivation temperatures ranged between 175° C. and 315° C. while the treatment time ranged between one and two hours. At the end of reactivation treatment, the nitrogen oxide/nitrogen flow was terminated and the reactor temperature was adjusted to 315° C. and the reactant feed resumed.

In order o evaluate the effectiveness of the method set forth herein, measurements were made of percent total conversion, percent per single pass yield or percent yield (% Yield) and percent selectivity (% Sel), which are defined as follows:

$$\text{Percent Conversion} = \frac{\text{Moles of aldehyde reacted}}{\text{Moles of aldehyde fed}} \times 100$$

$$\text{Percent Single Pass Yield} = \frac{\text{Moles of product recovered}}{\text{Moles of aldehyde fed}} \times 100$$

$$\text{Percent Selectivity} = \frac{\text{Moles of product recovered}}{\text{Moles of aldehyde reacted}} \times 100$$

In the first series of examples reported hereinbelow, two types of promoted catalysts were reactivated and subsequently employed for the selective oxidation of methacrolein (MA) to methacrylic acid (MAA). Table I presents the reactivation conditions and results for the arseniccopper promoted catalyst $PMo_{12}As_{0.5}Cu_{0.25}O_z$. The catalyst component was supported on a 0.3 cm Alundum carrier for Examples 1–10; 35 weight percent of the catalyst component thereon in Examples 1–5 and 30 weight percent of the catalyst component thereon in Examples 6–10. Contact time of the reactant feed over the catalyst varied from 1.95 seconds to 2.81 seconds and atmospheric pressure was employed.

Example 1 was employed as a control, the catalyst having no reactivation treatment. Conversion measurements were made after the catalyst had been used for 20 hours. The control catalyst was then treated successively to the NO/N$_2$ reactivation feed for periods of one hour in each of the succeeding examples, 2-5. Following reactivation, the reactant feed was again resumed and conversion measurements made after various periods of time following each reactivation as indicated in Table I under the heading Run (hrs.).

Example 6 was another charge of the same catalyst composition which had been run for 143.4 hours and which had received no reactivation. The catalyst was then reactivated for Example 7 with one treatment of NO/N$_2$ at 175° C. and tested at successive periods of time on-stream with the reactant feed, as presented in Table I, Examples 7-10.

Example 11 was a control which had been run for 144.6 hours. Reactivation of the control catalyst was then conducted in Example 12 with one treatment of NO/N$_2$ at 6 psig (0.04 MPa). Aldehyde conversions were run at successive time intervals following reactivation and are reported for Examples 11-14.

Example 15 was another charge of the control used for Example 11 reactivated with one treatment of NO/N$_2$, 6.5/93.5, at atmospheric pressure and again utilized for aldehyde conversions at successive periods of time on-stream and reported in Examples 15-21.

TABLE II

| | | Nitric Oxide Reactivation of PMo$_{12}$As$_{0.5}$Cu$_{0.25}$O$_z$ | | | | |
|---|---|---|---|---|---|---|
| Ex. No. | Treatment | Reactivation Conditions Time and Temp °C. | % Yield of MAA | % Sel to MAA | % Total Conversion | Run (Hrs.) |
| 11 | None | — | 55.9 | 87.5 | 63.9 | 144.6 |
| 12 | NO/N$_2$ | 1 hr. at 325° | 67.3 | 85.7 | 78.5 | 1.0 |
| 13 | NO/N$_2$ | — | 69.3 | 82.2 | 84.4 | 4.0 |
| 14 | NO/N$_2$ | — | 71.0 | 82.9 | 85.7 | 6.25 |
| 15 | NO/N$_2$ | 1 hr. at 325° | 62.4 | 82.5 | 75.7 | 1.0 |
| 16 | NO/N$_2$ | — | 65.6 | 82.5 | 79.6 | 3.25 |
| 17 | NO/N$_2$ | — | 67.9 | 84.1 | 80.8 | 6.25 |
| 18 | NO/N$_2$ | 1 hr. at 325° | 62.2 | 86.9 | 71.5 | 1.0 |
| 19 | NO/N$_2$ | — | 62.6 | 85.7 | 73.1 | 3.25 |
| 20 | NO/N$_2$ | — | 65.4 | 86.5 | 75.6 | 6.25 |
| 21 | NO/N$_2$ | — | 64.9 | 85.4 | 76.1 | 10.25 |

Table III presents the reactivation conditions and subsequent use of the antimony-copper promoted catalyst PMo$_{12}$Sb$_{0.22}$Cu$_{0.25}$O$_z$. The catalyst component was supported on a 0.3 cm Alundum carrier coated at the 28

TABLE I

| | | Nitric Oxide Reactivation of PMo$_{12}$As$_{0.5}$Cu$_{0.25}$O$_z$ | | | | |
|---|---|---|---|---|---|---|
| Ex. No. | Treatment | Reactivation Conditions Time and Temp °C. | % Yield of MAA | % Sel to MAA | % Total Conversion | Run (Hrs.) |
| 1 | None | — | 20.7 | 92.9 | 22.3 | 20 |
| 2 | NO/N$_2$ | 1 hr. at 250° | 38.9 | 94.1 | 41.3 | 0.65 |
| 3 | NO/N$_2$ | 1 additional hr. at 250° | 40.4 | 94.1 | 42.9 | 0.3 |
| 4 | NO/N$_2$ | 1 additional hr. at 250° | 40.8 | 92.8 | 43.9 | 1.5 |
| 5 | NO/N$_2$ | 1 additional hr. at 275° | 37.0 | 92.8 | 39.9 | 0.25 |
| 6 | None | — | 38.1 | 88.0 | 43.2 | 143.4 |
| 7 | NO/N$_2$ | 1 hr. at 175° | 55.1 | 79.2 | 69.7 | 0.25 |
| 8 | — | — | 55.9 | 84.2 | 66.3 | 4.3 |
| 9 | — | — | 54.4 | 86.1 | 63.2 | 9.9 |
| 10 | — | — | 47.7 | 89.6 | 53.2 | 27.6 |

Table II presents additional examples of the reactivation conditions and subsequent use of the same catalyst composition as reported in Table I. The catalyst was supported on a 0.3 cm spherical Alundum carrier coated at the 30 weight percent level. Contact time varied from 3.07 seconds to 3.21 seconds; pressure was 6 psig (0.04 MPa) and atmospheric and the reactivating gas mixture was 50/50, NO/N$_2$ unless otherwise noted.

weight percent level. Contact time varied from 3.05 seconds to 3.16 seconds; pressure was atmospheric and the reactivating gas mixture was 50/50 NO/N$_2$.

Example 22 was a control which had been run for 273.8 hours. It was reactivated in Example 23 with one treatment of NO/N$_2$ and then employed for aldehyde conversions at successive time intervals which are reported in Examples 23-27. Example 28 was the catalyst of Example 27 subjected to one additional reactivation.

TABLE III

| | | Nitric Oxide Reactivation of PMo$_{12}$Sb$_{0.22}$Cu$_{0.55}$O$_z$ | | | | |
|---|---|---|---|---|---|---|
| Ex. No. | Treatment | Reactivation Conditions Time and Temp °C. | % Yield of MMA | % Sel to MMA | % Total Conversion | Run (Hrs.) |
| 22 | None | — | 35.3 | 89.7 | 39.4 | 273.8 |
| 23 | NO/N$_2$ | 1 hr. at 315° | 48.0 | 91.3 | 52.6 | 0.3 |
| 24 | NO/N$_2$ | — | 55.3 | 79.4 | 69.7 | 22.5 |
| 25 | NO/N$_2$ | — | 52.5 | 77.4 | 67.9 | 29.7 |
| 26 | NO/N$_2$ | — | 48.0 | 76.9 | 62.4 | 47.8 |
| 27 | NO/N$_2$ | — | 39.9 | 83.9 | 47.6 | 49.1 |
| 28 | NO/N$_2$ | 1.4 additional hr. | 49.8 | 76.8 | 64.9 | 50.2 |

TABLE III-continued

Nitric Oxide Reactivation of $PMo_{12}Sb_{0.22}Cu_{0.55}O_z$

| Ex. No. | Treatment | Reactivation Conditions Time and Temp °C. | % Yield of MMA | % Sel to MMA | % Total Conversion | Run (Hrs.) |
|---|---|---|---|---|---|---|
| | | at 315° | | | | |

By reviewing the data presented in Tables I–III, it can be seen that in every instance a deactivated catalyst was reactivated according to the method of the present invention, an increase in percent yield and total conversion occurred. Generally speaking, the more severely deactivated the catalyst was prior to the treatment, the more improved was its performance following reactivation. Based on the work reported in Tables I–III, it is envisioned that a catalyst not be permitted to reach a stage of deactivation wherein the percent yield decreases to less than about 55%. At this point, the catalyst can be reactivated with relative ease and restored to substantially its full activity.

As stated hereinabove, the catalysts of the present invention are not limited in their use solely to the conversion of unsaturated aldehydes. To demonstrate that the method herein can be employed to reactivate a deactivated PMA based catalyst which will then convert saturated aldehydes, such as isobutyraldehyde to methacrylic acid, a separate PMA based catalyst, promoted with an alkali metal, bismuth, copper and vanadium, supported on a 0.3 cm Alundum carrier was selected. The catalyst had previously been subjected to more than 500 hours on stream for the conversion of methacrolein to methacrylic acid.

The catalyst was then placed in a reactor and a feed of isobutyraldehyde was passed thereover. Conditions for this work were as discussed hereinabove for the conversion of methacrolein to methacrylic acid. Examples 29 and 30 serve as controls where isobutyraldehyde was reacted over the deactivated catalyst. After a continuous run of 14 hours, the catalyst was then subjected to a reactivation treatment of straight NO for one hour at 300° C. Example 31 reports the use of the catalyst back on-stream with isobutyraldehyde. After one hour, another treatment of NO for one hour was provided and the catalyst was then returned to use. Example 32 reports the use of the catalyst thus treated five hours later. The foregoing examples are presented in Table IV.

the percent yield value drops below about 55, as stated hereinabove.

In conclusion, considering the increases in percent yield of methacrylic acid from methacrolein and isobutyraldehyde that have been obtained when a deactivated catalyst has been reactivated according to the method set forth herein, it should be apparent that the objects of the invention have been met. It is to be understood that the reactivations disclosed herein are applicable in general to PMA based catalysts which, as stated hereinabove, can be employed for the preparation of methacrylic acid from saturated and unsaturated aldehydes. It is to be further understood that the catalysts can include one or more promoters and that the presence or absence of these additional elements or compounds will not affect the method of reactivation set forth herein. Furthermore, while these may be employed to improve some aspect of the activity of the catalyst when fresh or reactivated, the specific catalyst composition is not deemed to be a portion of the invention claimed herein. Nor, is the type of conversion effected with the catalyst significant to the operation of the present invention.

Thus, it should also be apparent to those skilled in the art that the subject invention is operable on PMA based catalysts having certain ratios of molybdenum to phosphorous and it is operable when other oxides of nitrogen, temperatures and pressures are employed. It is to be understood that while these variables fall within the scope of the claimed invention, the subject invention is not to be limited by the examples set forth herein. These have been provided merely to provide a demonstration of operability and therefore the selection of other oxides of nitrogen and the amounts thereof can be determined without departing from the spirit of the invention herein disclosed and described. Moreover, the scope of the invention shall include all modifications and variations that fall within the scope of the attached claims.

We claim:

1. A method for the reactivation of phosphomolybdic

TABLE IV

Nitric Oxide Reactivation of an Alkali Metal Promoted PMA Based Catalyst

| Ex. No. | Treatment | Reactivation Conditions Time and Temp °C. | % Yield of MAA | % Sel to MAA | % Total Conversion | Run (Hrs). |
|---|---|---|---|---|---|---|
| 29 | — | — | 18.6 | 18.6 | 100 | 1 |
| 30 | — | — | 20.1 | 20.1 | 100 | 14 |
| 31 | NO | 1 hr. at 300° | 27.7 | 27.7 | 100 | 1 |
| 32 | NO | 1 hr. at 300° | 29.6 | 29.6 | 100 | 5 |

As can be seen in Table IV, the catalyst had been deactivated. By comparison, a freshly prepared and calcined catalyst would provide a percent yield of methacrylic acid from isobutyraldehyde of about 60. Therefore, it can be seen that the method of the present invention is useful to reactivate deactivated catalysts. In order to return the catalyst consistently to a highly useful material having properties as good as or better than the freshly prepared and calcined catalyst, reactivation treatment should be made prior to the time that acid based catalysts having a ratio of molybdenum to phosphorus of 3:1 to 15:1, wherein said phosphomolybdic acid based catalyst has the formula $Mo_xP_yA_aB_bC_cD_dE_eO_z$ wherein A is selected from the group consisting of ammonium, cesium, potassium, rubidium and thallium; B is selected from the group consisting of copper and vanadium; C is selected from the group consisting of antimony, aresenic, bismuth and tellurium; D is palladium; E is aluminum, barium, calcium, cerium, chromium, cobalt, iron, magnesium, manganese, nickel, tantalum, titanium, tungsten, zinc, zirconium, chlorine and/or bromine; x can be 3 to 15; y can be 1 to 1.5; a can be 0.1 to 3; b can be 0.1 to 3; c can be 0 to 2; d can be 0 to 2; e can be 0 to 4 and z is a number necessary to satisfy the valence of all other elements, which have become deactivated in the preparation of acids from aldehydes comprising the step of:

feeding an oxide of nitrogen over the catalyst at a temperature of from about 100° C. to about 400° C.

2. A method for the reactivation of phosphomolybdic acid based catalysts, as set forth in claim 1, wherein the catalyst is contained within a reactor, and including the additional steps of terminating the feed of reactant to the reactor; and
sweeping the reactor with an inert gas prior to the feeding step.

3. A method for the reactivation of phosphomolybdic acid based catalysts, as set forth in claim 2, wherein the step of feeding is conducted at a temperature of from about 175° C. to about 350° C.

4. A method for the reactivation of phosphomolybdic acid based catalysts, as set forth in claim 1, wherein the step of feeding is conducted for a period of from about five minutes to about three hours and at a pressure ranging from near atmospheric to superatmospheric.

5. A method for the reactivation of phosphomolybdic acid based catalysts, as set forth in claim 1, wherein said oxide of nitrogen is selected from the group consisting of all oxides of nitrogen gas and mixtures thereof.

6. A method for the reactivation of phosphomolybdic acid based catalysts, as set forth in claim 5, wherein said oxide of nitrogen is nitric oxide and is carried with an inert gas.

7. A method for the reactivation of phosphomolybdic acid based catalysts, as set forth in claim 1, wherein x is 12; y is 1; a is 1 to 2; b is 0.1 to 1; c is 0 to 0.7; d is 0 to 1 and e is 0 to 1.

8. A method for the reactivation of phosphomolybdic acid based catalysts, as set forth in claim 1, wherein the composition of said phosphomolybdic acid based catalyst contains arsenic.

9. A method for the reactivation of phosphomolybdic acid based catalysts, as set forth in claim 1, wherein the composition of said phosphomolydic acid based catalyst contains antimony.

10. A method for the reactivation of phosphomolybdic acid based catalysts, as set forth in claim 1, wherein the composition of said phosphomolybdic acid based catalyst contains copper.

11. A method for the reactivation of phosphomolybdic acid based catalysts, as set forth in claim 1, wherein the composition of said phosphomolybdic acid based catalyst contains bismuth.

12. A method for the reactivation of phosphomolybdic acid based catalysts, as set forth in claim 1, wherein the composition of said phosphomolybdic acid based catalyst contains vanadium.

13. A method for the reactivation of phosphomolybdic acid based catalysts, as set forth in claim 1, wherein the composition of said phosphomolybdic acid based catalyst contains an alkali metal.

14. A method for the reactivation of phosphomolybdic acid based catalysts having a ratio of molybdenum to phosphorus of 3:1 to 15:1, wherein said phosphomolybdic acid based catalyst has the formula $Mo_xP_yA_aB_bC_cD_dE_eO_z$ wherein A is selected from the group consisting of ammonium, cesium, potassium, rubidium and thallium; B is selected from the group consisting of copper and vanadium; C is selected from the group consisting of antimony, arsenic, bismuth and tellurium; D is palladium; E is aluminum, barium, calcium, cerium, chromium, cobalt, iron, magnesium, manganese, nickel, tantalum, titanium, tungsten, zinc, zirconium, chlorine and/or bromine; x can be 3 to 15; y can be 1 to 1.5; a can be 0.1 to 3; b can be 0.1 to 3; c can be 0 to 2; d can be 0 to 2; e can be 0 to 4 and z is a number necessary to satisfy the valence of all other elements, which have become reduced by the catalytic oxidation, dehydation or oxydehydrogenation of organic compounds comprising the step of:

feeding an oxide of nitrogen over the catalyst at a temperature of from about 100° C. to about 400° C.

15. A method for the reactivation of phosphomolybdic acid based catalysts, as set forth in claim 14, wherein the catalyst is contained within a reactor, and including the additional steps of terminating the feed of reactant to the reactor; and
sweeping the reactor with an inert gas prior to the feeding step.

16. A method for the reactivation of phosphomolybdic acid based catalysts, as set forth in claim 15, wherein the step of feeding is conducted at a temperature of from about 175° C. to about 350° C.

17. A method for the reactivation of phosphomolybdic acid based catalysts, as set forth in claim 14, wherein the step of feeding is conducted for a period of from about five minutes to about three hours and at a pressure ranging from near atmospheric to superatmospheric.

18. A method for reactivation of phosphomolybdic acid based catalysts, as set forth in claim 14, wherein said oxide of nitrogen is selected from the group consisting of all oxides of nitrogen gas and mixtures thereof.

19. A method for the reactivation of phosphomolybdic acid based catalysts, as set forth in claim 18, wherein said oxide of nitrogen is nitric oxide and is carried with an inert gas.

20. A method for the reactivation of phosphomolybdic acid based catalysts, as set forth in claim 14, wherein x is 12; y is 1; a is 1 to 2; b is 0.1 to 1; c is 0 to 0.7; d is 0 to 1 and e is 0 to 1.

21. A method for the reactivation of phosphomolybdic acid based catalysts, as set forth in claim 14, wherein the composition of said phosphomolybdic acid based catalyst contains arsenic.

22. A method for the reactivation of phosphomolybdic acid based catalysts, as set forth in claim 14, wherein the composition of said phosphomolybdic acid based catalyst contains antimony.

23. A method for the reactivation of phosphomolybdic acid based catalysts, as set forth in claim 14, wherein the composition of said phosphomolybdic acid based catalyst contains copper.

24. A method for the reactivation of phosphomolybdic acid based catalysts, as set forth in claim 14, wherein the composition of said phosphomolybdic acid based catalyst contains bismuth.

25. A method for the reactivation of phosphomolybdic acid based catalysts, as set forth in claim 14, wherein the composition of said phosphomolybdic acid based catalyst contains vanadium.

26. A method for the reactivation of phosphomolybdic acid based catalysts, as set forth in claim 14, wherein the composition of said phosphomolybdic acid based catalyst contains an alkali metal.

* * * * *